(12) United States Patent
Yamada

(10) Patent No.: US 6,369,700 B1
(45) Date of Patent: Apr. 9, 2002

(54) ON-VEHICLE DBF RADAR APPARATUS

(75) Inventor: Yukinori Yamada, Susono (JP)

(73) Assignee: Toyota Jidosha Kabushiki Kaisha (JP)

( * ) Notice: Subject to any disclaimer, the term of this patent is extended or adjusted under 35 U.S.C. 154(b) by 0 days.

(21) Appl. No.: 09/379,793

(22) Filed: Aug. 24, 1999

(30) Foreign Application Priority Data

Aug. 27, 1998 (JP) .......................................... 10-241652

(51) Int. Cl.$^7$ ................................................ B60Q 1/00
(52) U.S. Cl. ....................... 340/435; 340/903; 340/904; 340/905; 180/169; 342/455
(58) Field of Search .................. 340/435, 903, 340/904, 961, 942, 436, 905; 180/169, 167; 701/300, 301, 302; 342/455, 453, 454

(56) References Cited

U.S. PATENT DOCUMENTS

| 4,926,171 A | * | 5/1990 | Kelley | 340/961 |
| 5,343,206 A | | 8/1994 | Ansaldi et al. | 342/70 |
| 5,467,283 A | * | 11/1995 | Butsuen | 364/461 |
| 5,598,163 A | | 1/1997 | Cornic et al. | 342/70 |
| 5,633,642 A | * | 5/1997 | Hoss | 342/70 |
| 5,699,056 A | * | 12/1997 | Yoshida | 340/905 |
| 5,767,803 A | | 6/1998 | Yamada | 342/69 |
| 5,999,874 A | * | 12/1999 | Winner et al. | 701/93 |

FOREIGN PATENT DOCUMENTS

DE 19749545 A1 11/1996

* cited by examiner

Primary Examiner—Edward Lefkowitz
Assistant Examiner—Davetta W. Goins
(74) Attorney, Agent, or Firm—Finnegan, Henderson, Farabow, Garrett & Dunner, L.L.P.

(57) ABSTRACT

An on-vehicle DBF radar apparatus is mounted on a vehicle and is arranged to detect an object around the vehicle by scanning with radar beams synthesized by digital signal processing. The radar apparatus has a lane shape acquiring section for acquiring a shape of a lane on which the vehicle is driving. In the radar apparatus a scanning range of the radar beams is limited according to the shape of the lane acquired by the lane shape acquiring section. The radar apparatus has advantages of high detection rate and detection accuracy.

6 Claims, 7 Drawing Sheets

US 6,369,700 B1

ON-VEHICLE DBF RADAR APPARATUS

BACKGROUND OF THE INVENTION

1. Field of the Invention

The present invention relates to a radar apparatus mounted on a vehicle and adapted for detection of such an object as a preceding car or an obstacle around the vehicle and, more particularly, to an on-vehicle DBF radar apparatus arranged to detect the object by scanning with radar beams synthesized by digital signal processing.

2. Related Background Art

Since the DBF (digital beamforming) radar apparatus synthesizing the radar beams by digital signal processing needs to have no scanning mechanism, it can be designed readily in compact and lightweight structure and it is resistant to the negative effect of vibration. Therefore, it is expected to be used as a radar apparatus for on-vehicle use.

In the conventional DBF radar apparatus popularly employed, a scanning range and an effective detection distance were preset and the radar beams swept an entire detection range determined by the scanning range and effective detection distance.

Incidentally, the radar beam scanning in the DBF radar apparatus was actually achieved in such a way that the scanning range was divided into plural directions and a radar beam was synthesized in each of the divided directions. Therefore, the synthesis operation of radar beam was carried out the number of division times in one scanning.

This posed the problem that as the scanning resolution was enhanced, the operation amount for the synthesis of radar beams became larger, so as to lengthen the operation time and this resulted in delay in acquisition of object detection information.

In contrast with it, if the operation amount was decreased by lowering the scanning resolution of radar beams, the time necessary for one scanning could be reduced, but the target detection accuracy would be degraded.

SUMMARY OF THE INVENTION

An on-vehicle DBF radar apparatus of the present invention has been accomplished in order to solve the above problems and is characterized by comprising lane shape acquiring means for acquiring a shape of a lane on which a vehicle is driving and by limiting a scanning range of radar beams according to the shape of the lane acquired by the lane shape acquiring means.

A target to be detected by the on-vehicle radar apparatus is normally an object on a driving road including a driving lane, either a preceding car or an obstacle. In other words, any object present in areas except for the driving road can normally be regarded as an object not to be detected.

According to the present invention, because the scanning range is limited according to the lane shape, the areas except for the driving road can be set as non-scanned areas while the driving road is maintained in the scanning range. In this case, because the scanning range becomes narrower, the processing time necessary for the radar beam scanning can be decreased without degradation of the scanning resolution.

The scanning range is desirably made to differ according to a target distance for object detection. Assuming that the width of the driving road is constant, angles subtending the width of the driving road become narrower with increasing distance; therefore, the shape of the detection range can be approximated to the shape of the driving road by narrowing the scanning range with increasing distance.

In that case, the center of the scanning range desirably varies according to the shape of the driving road, i.e., varies along the shape of the lane detected.

This permits the detection range to be narrowed into a necessary and sufficient region, whereby the processing time can be decreased more.

One of the lane shape acquiring means is lane curvature detecting means for detecting a degree of curvature of the lane. The curvature of lane can be calculated from a vehicle velocity and a yaw rate. Vehicle velocity detecting means or yaw rate detecting means is often mounted on vehicles for the other purposes and thus a dedicated sensor does not have to be prepared when the detection result of these means is used to obtain the curvature of lane.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
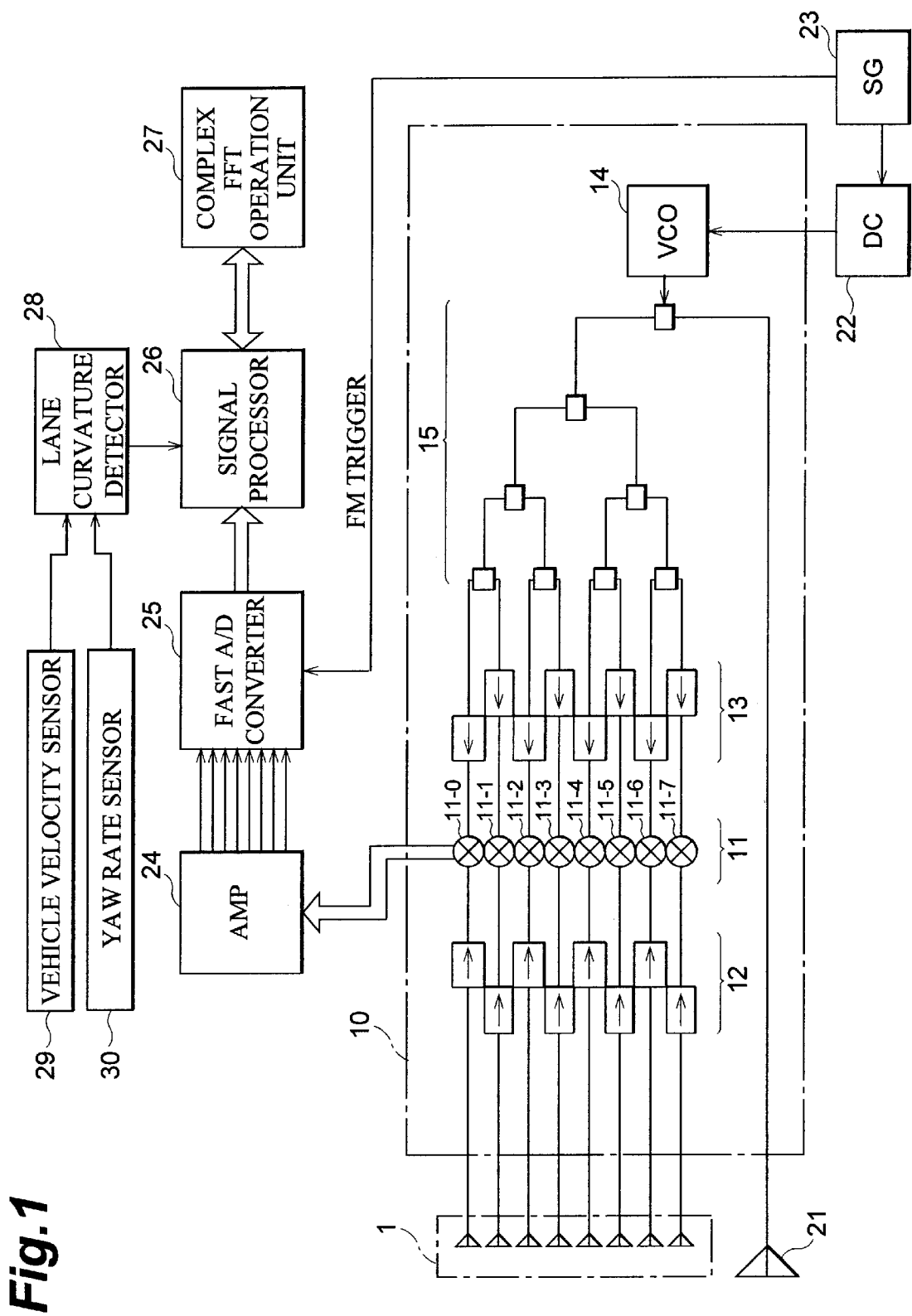
FIG. 1 is a structural diagram to show an on-vehicle DBF radar apparatus as an embodiment of the present invention.

FIG. 1 is a diagram to show the structure of the on-vehicle DBF radar apparatus as an embodiment of the present invention. This radar apparatus is also an FM-CW radar apparatus using a transmitted signal resulting from frequency modulation (FM) of continuous wave (CW).

An array antenna 1 for reception has eight antenna elements corresponding to respective receiving channels. The antenna elements are arranged in the horizontal direction and connected via individual isolators composing an isolator group 12 to respectively corresponding mixers 11-0 to 11-7.

The mixers 11-0 to 11-7 are arranged each to mix a received signal arriving at each antenna element with part of the transmitted signal to obtain a beat signal. Transmitted signal components supplied as local signals to the mixers 11-0 to 11-7 are supplied thereto from a voltage-controlled oscillator (VCO) 14 via a branch circuit 15 and an isolator group 13.

The oscillator 14 is a varactor control type Gunn oscillator having the center frequency of f0 (for example, 60 GHz), which outputs a modulated wave in the range of f0±(½)ΔF, based on control voltage outputted from a dc power supply 22 for modulation. The FM modulation herein is triangular modulation in which frequency increasing intervals (up intervals) and frequency decreasing intervals (down intervals) are alternately continuous. In the triangular modulation, frequencies linearly increase from f0−(½)ΔF to f0+(½)ΔF in the up intervals, while frequencies linearly decrease from f0+(½)ΔF to f0−(½)ΔF in the down intervals within the same period of time as in the up intervals.

This FM modulated wave is supplied via the branch circuit 15 to a transmitter antenna 21 to be radiated as a transmitted signal and is also branched into eight channels as local signals, as described above, to be mixed respectively with the received signals in the eight channels in the respective mixers 11-0 to 11-7 to generate beat signals of the respective channels. The dc power supply 22 changes its output voltage values in a triangular pattern on a periodic basis under control of a signal source 23 for modulation.

At the post end of the high-frequency circuit 10 composed of the mixer group 11, the isolator groups 12, 13, the oscillator 14, and the branch circuit 15, there are provided a low-noise amplifier 24, a fast A/D converter 25, a signal processing unit 26, and a complex FFT operation unit 27.

The low-noise amplifier (amp) 24 amplifies the beat signals of the eight channels outputted from the mixers 11-0 to 11-7 in parallel. The amp 24 incorporates a low-pass filter having the cut-off frequency of 77 kHz for antialiasing.

The fast A/D converter 25 is a circuit for effecting A/D conversion of the beat signals of the eight channels in parallel and simultaneously, which samples the signals at 200 kHz. At this sampling frequency the converter 25 performs sampling at 128 points in each of the up interval and down interval of the triangular wave in the FM modulation.

The signal processing unit 26 acquires digital beat signals of the respective channels from the fast A/D converter 25 and performs various signal processing operations, including the DBF synthesis operation, to carry out a recognition operation of a target (object).

The DBF synthesis is a synthesis operation to synthesize signals in respective channels to obtain a radar beam having the main beam in a desired direction by digital signal processing. The DBF synthesis technology is known technology and the concept thereof will be described briefly referring to FIG. 2.

Figure 2:
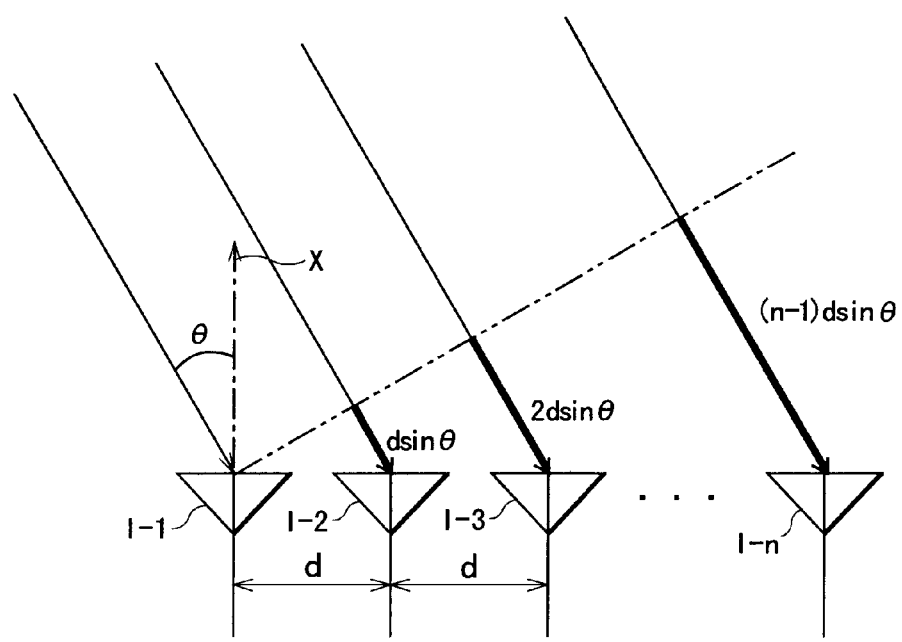
FIG. 2 is a diagram for explaining the principle of the DBF synthesis.

When a radio wave coming from a direction of an angle θ with respect to a center direction X of the radar is received by an array antenna composed of n antenna elements 1-1 to 1-n arranged at a spacing d and when the reference is a propagation path length of the radio wave to the antenna element 1-1, each propagation path length to the antenna element 1-2, . . . , or to the antenna element 1-n is $d \sin \theta$, . . . , or $(n-1)d \sin \theta 0$, respectively, longer than the reference, as illustrated in FIG. 2. Therefore, phases of the radio wave arriving at the antenna element 1-2, . . . , the antenna element 1-n lag behind a phase of the radio wave arriving at the antenna element 1-1 by the respective lengths.

These delay amounts are $(2\pi d \sin \theta)/\lambda$, . . . , $(2(n-1)\pi d \sin \theta)/\lambda$, respectively. Here, λ is the wavelength of the radio wave. Received signals are advanced by these delay phase amounts by an arithmetic operation in the signal processing unit 26, which realizes such a situation that the radio wave from the direction of θ is received in the same phase at all the antenna elements. The radar beam having the main beam in the direction of θ can be generated by summing up the signals of all the channels. The signal processing unit 26 is arranged to be capable of changing θ at intervals of 0.5° between −10° and +10°. To shift this θ, i.e., the direction of the radar beam in succession is the beam scanning.

The complex FFT operation unit 27 is an arithmetic operation unit for carrying out the complex FFT operation out of the sequential operations in the signal processing unit 26 in place thereof. The complex FFT operation unit 27 receives the digital beat signals of the respective channels from the signal processing unit 26, performs the complex FFT operation therewith, and sends the result back to the signal processing unit 26.

A lane curvature detector 28 is a means for calculating a radius R1 of curvature of a lane on which a vehicle carrying this radar apparatus is driving. The lane curvature radius R1 can be calculated according to the following equation.

$$R1 = v/\gamma \qquad (1)$$

In this equation, v is the vehicle velocity and γ is the yaw rate. Since the yaw rate γ is equal to an angular velocity ω of the vehicle turning about the center of the curvature of the current driving lane, the curvature radius R1 of the lane can be obtained by dividing the vehicle velocity by the yaw rate γ. The vehicle velocity v and yaw rate γ can be obtained from vehicle velocity sensor 29 and from yaw rate sensor 30, respectively. The vehicle velocity sensor 29 and yaw rate sensor 30 can be those that are also used for vehicle behavior control or the like.

The curvature radius R1 of the driving lane obtained in the lane curvature detector 28 is sent to the signal processing unit 26 to be used for setting of the scanning range.

The signal processing unit 26 can form the radar beam in either of forty one directions at intervals of 0.5° from −10° to +10° by the DBF synthesis operation, as described above. This means that the maximum scanning range is from −10° to +10°, irrespective of the distance. However, this radar apparatus is arranged to limit the scanning range according to the curvature radius R1 and distance, thereby decreasing the operation amount drastically. A specific example will be described hereinafter concerning the limitation of the scanning range.

Figure 3:
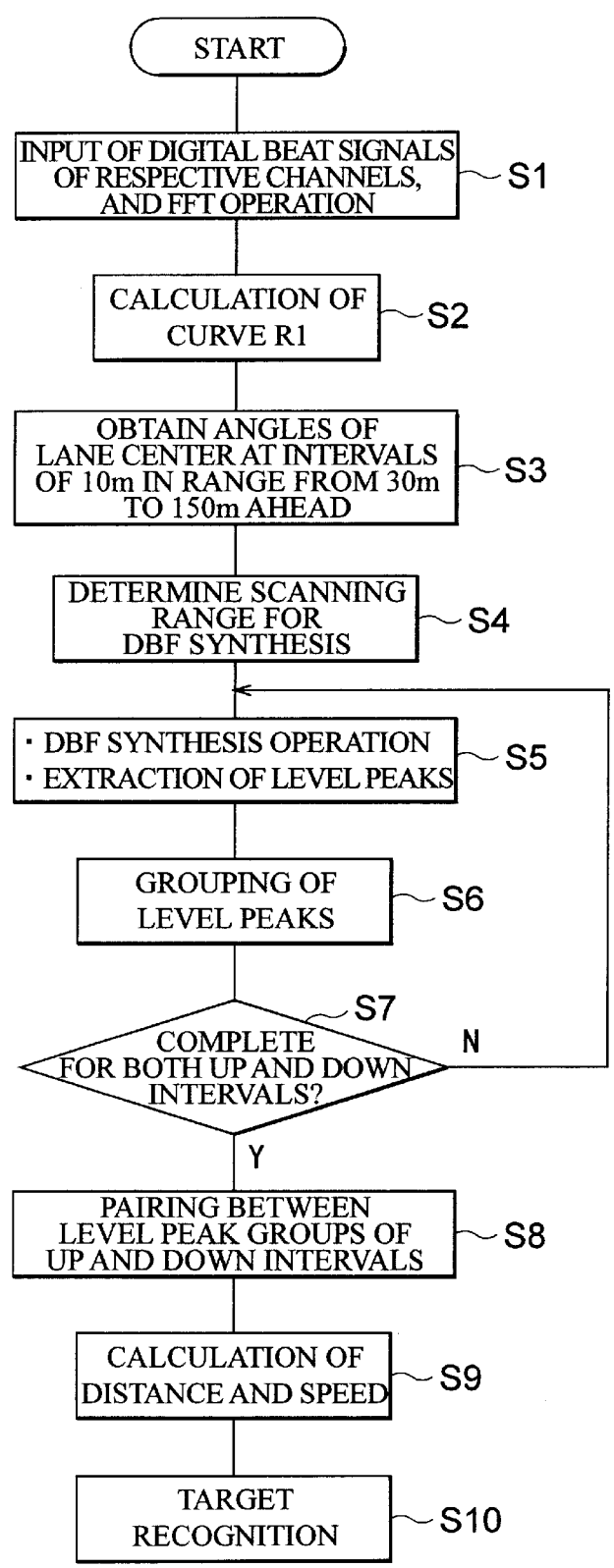
FIG. 3 is a flowchart to show the operation of the present embodiment.

Next, the procedures of the operation of the present apparatus will be described according to the flowchart illustrated in FIG. 3.

First, step S1 is to capture the digital beat signals of the respective channels. Since the digital beat signals of the respective channels are obtained by the sampling at 128 points in each of the up interval and down interval in every channel, they are data totally at 128 (points)×2 (intervals)×8 (channels)=2048 points. Then the FFT (fast Fourier transform operation) is carried out channel by channel, based on these data, thereby obtaining beat frequency information. The beat frequency information obtained here is stored all in a memory section in the signal processing unit 26. This beat frequency information of the respective channels includes phase information necessary for the later DBF operation.

Next, the processing unit transfers to step S2 to calculate the curvature radius R1 of the current driving lane. The curvature radius R1 is calculated according to Eq. (1) as stated previously. Namely, it is obtained by dividing the vehicle velocity v by the yaw rate γ.

Next, in step S3, calculated according to Eq. (2) below are angles indicating center positions according to distances of the current lane extending forward, that is, angles LC of the lane center at respective distances L.

$$LC = \sin^{-1}(L/(2 \times R1)) \tag{2}$$

Figure 4:
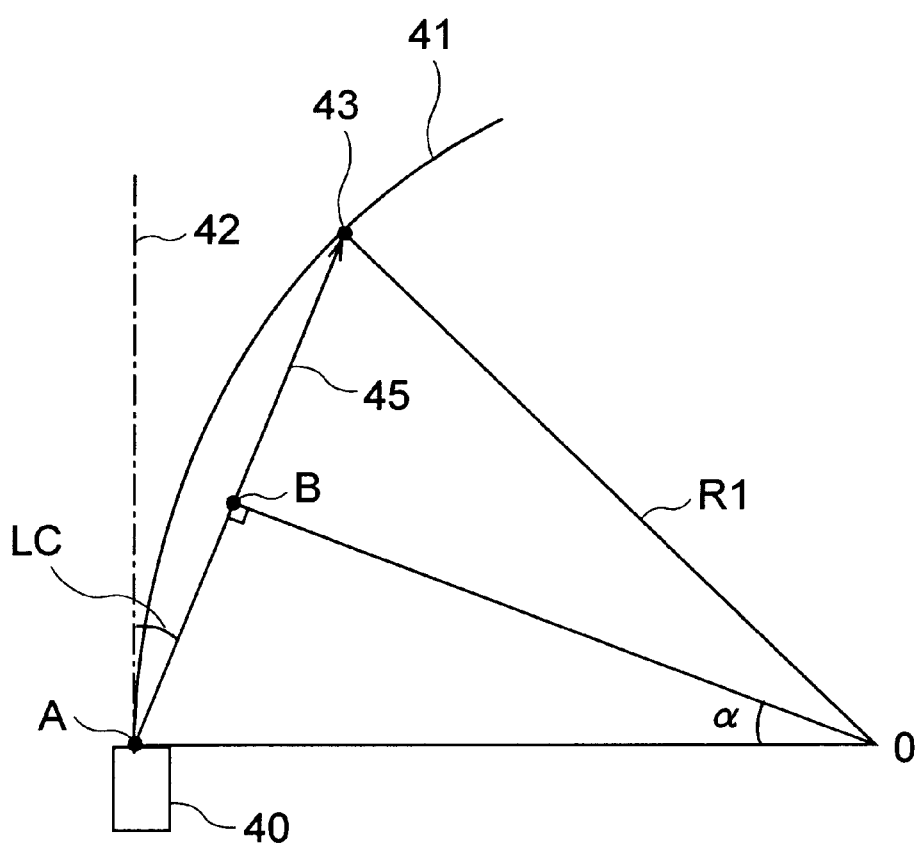
FIG. 4 is a diagram for explaining the meaning of an equation for calculating a center angle LC of a current lane.

FIG. 4 is a diagram for explaining the meaning of Eq. (2). It is supposed that the lane center 41 extending ahead of the vehicle 40 draws an arc having the curvature radius R1 with the center at O. An angle LC of the lane center at a distance L is an angle between a direction to a point 43 located on the lane center 41 and at the distance L from the vehicle 40 and a traveling direction, i.e., a tangential direction 42 to the lane center 41. Let A be the position of the vehicle 40 and B be an intersecting point between a chord 45 and a normal line to the chord 45 from the curvature center O. Then the angle LC of the current lane center is equal to an angle AOB, i.e., an angle $\alpha$. Therefore, the following relation holds.

$$\sin LC = \sin\alpha$$
$$= \text{segment } AB / \text{segment } AO$$
$$= (L/2)/R1$$

This proves the relation of Eq. (2) above.

The present embodiment is arranged to calculate the angles LC of the current lane center at distances of 10 m-intervals from 30 m to 90 m and the angle LC of the current lane center at the distance of 150 m, based on this Eq. (2).

Then the processing unit proceeds to step S4 to determine the scanning range for the DBF synthesis as a detection range. The scanning range differs according to the distance; the scanning range is narrowed with increasing distance. This embodiment is intended to detect objects on three lanes including the current lane and the both adjacent lanes. This is for the following reason: assuming that the lane width is constant, angular ranges made by the lane width to be detected become smaller with increasing distance.

The center of the scanning range is determined according to the lane shape, and the angles LC of the current lane center at the respective distances, obtained in step S3, are set as center scanning angles at the respective distances.

Figure 5A:
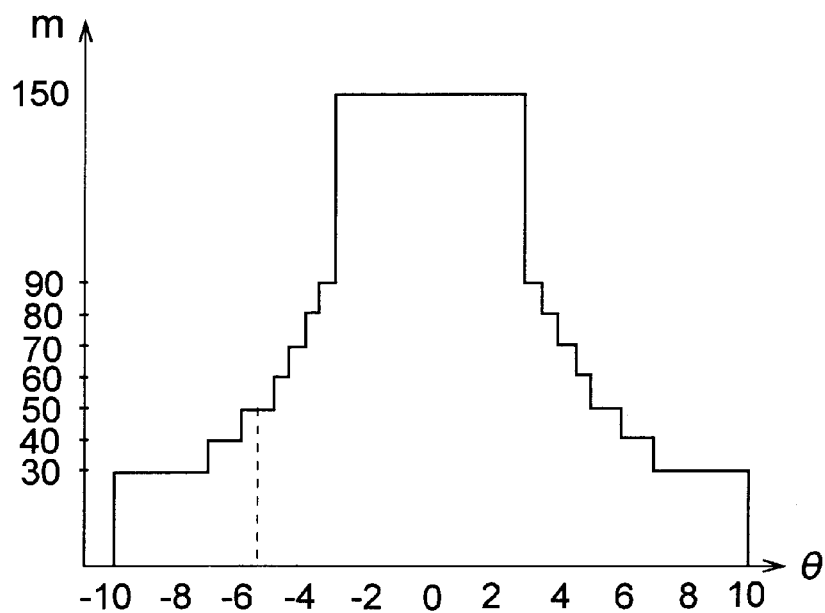
FIG. 5A is a graph to show a detection area.
Figure 5B:
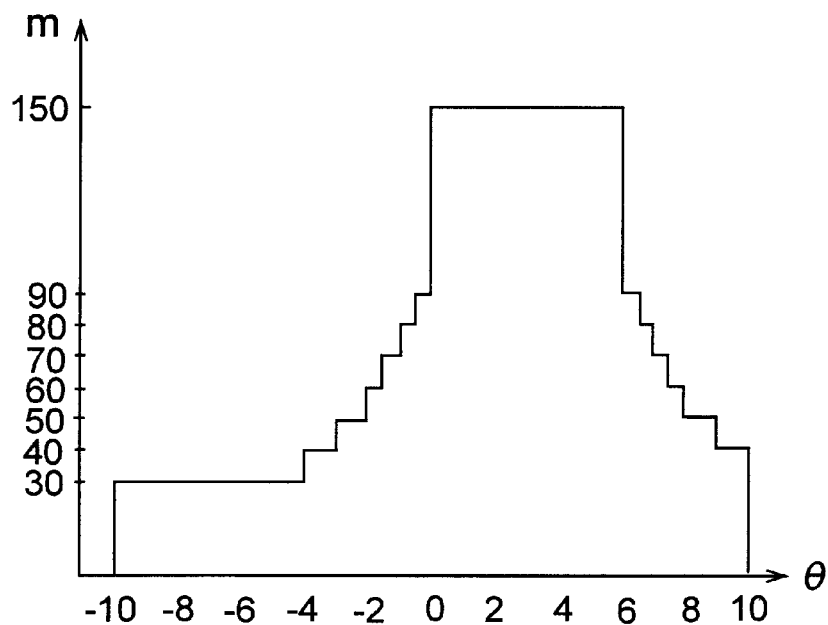
FIG. 5B is a graph to show another detection area.

FIGS. 5A and 5B are graphs to show detection ranges, in which scanning angles are plotted along the abscissa while the distances along the ordinate. FIG. 5A shows a situation in which the center of the current lane is a straight line and FIG. 5B a situation in which the center of the current lane draws an arc having the curvature radius of 300 m.

In FIG. 5A, the scanning range up to 30 m ahead is the maximum scanning range in which the scanning range is 20° from −10° to +10°. The scanning range from the distance 30 m to the distance 40 m is 14° from −7° to +7°. The scanning range from the distance 40 m to the distance 50 m is 12° from −6° to +6°. In this way, the scanning range becomes gradually narrower similarly on either side of 0° with increasing distance and the scanning range from the distance 90 m to the farther area is 6° from −3° to +3°.

When the center of the current lane draws an arc, the scanning center is shifted so as to match with the angles LC of the current lane center while the scanning ranges for the respective distance areas illustrated in FIG. 5A are maintained, as illustrated in FIG. 5B. However, if a scanning range shifted is off the maximum scanning range (from −10° to +10°), an off area will be excluded from the scanning range.

Figure 6:
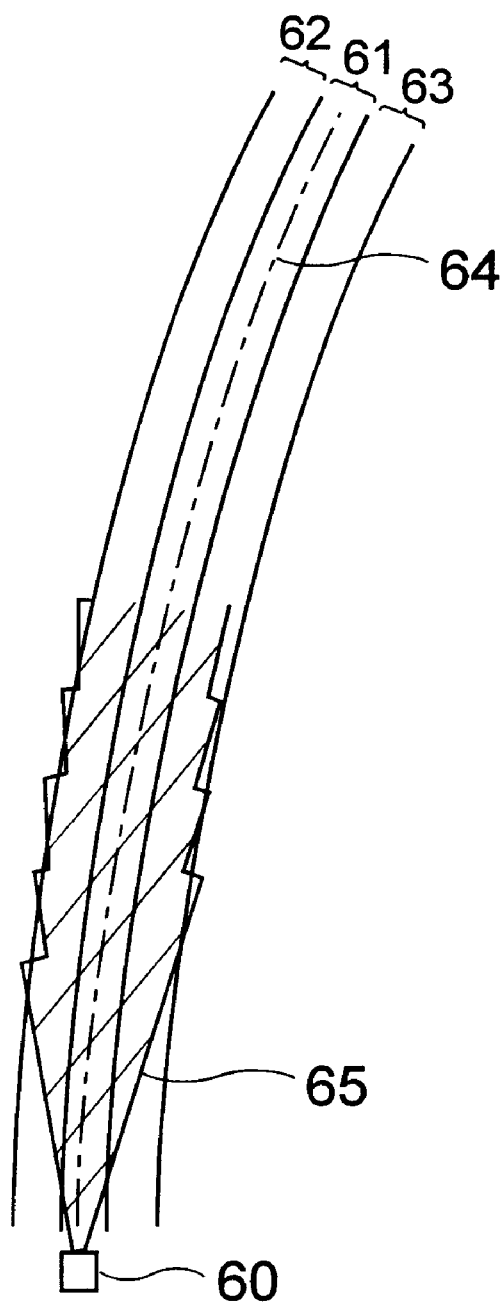
FIG. 6 is a diagram to show a spatial image of the detection area.

FIG. 6 is a diagram to show a spatial image of part of the scanning range illustrated in FIG. 5B. An arc is drawn by the lane 61 on which the vehicle 60 is driving and by the both adjacent lanes 62 and 63. In this figure the hatched area 65 is part of the detection range and it is seen that the scanning range becomes narrower stepwise on either side of the center 64 of the current lane with increasing distance.

The scanning range according to the distance can be obtained on a geometrical basis. For example, the present embodiment is so arranged that the target range for target detection is the three lanes including the current lane and the both adjacent lanes and that angular ranges corresponding to three times an ordinary lane width are preliminarily set according to the distance.

Next, step S5 is to carry out the DBF synthesis in each of the up interval and down interval in the detection range determined in step S4.

The FM-CW radar apparatus is arranged to detect the distance and relative velocity of the target from the beat frequencies as a result of mixing between the received signal and transmitted signal. On the other hand, supposing the target is a vehicle driving ahead, the relative velocity will be close to zero, or not so large. It can thus be considered that, supposing the vehicle running ahead is a target, the beat frequencies are approximately proportional to the distance of the target. This means that the distances plotted along the ordinate of the detection range illustrated in FIG. 5A or FIG. 5B can be approximately replaced by beat frequencies. The DBF synthesis is carried out in that detection range.

For example, referring to FIG. 5A, when the radar beam having the main beam in the direction of −5.5° is synthesized, it is synthesized using digital beat frequencies of the respective channels smaller than the frequency corresponding to the distance 50 m.

After completion of the DBF synthesis, the processing unit extracts peaks of beat signal intensities (hereinafter referred to simply as level peaks) with beat frequencies as a variable in every direction. A conceivable method for extracting the level peaks is a way of extracting level peaks, each indicating a peak at a level value not less than a predetermined value.

After completion of the extraction of level peaks, the processing unit moves to step S6 to carry out grouping of level peaks in each of the up interval and down interval. Namely, the processing unit groups level peaks of approximately equal beat frequencies adjacent in a scanning direction to create a level peak group.

Figure 7A:
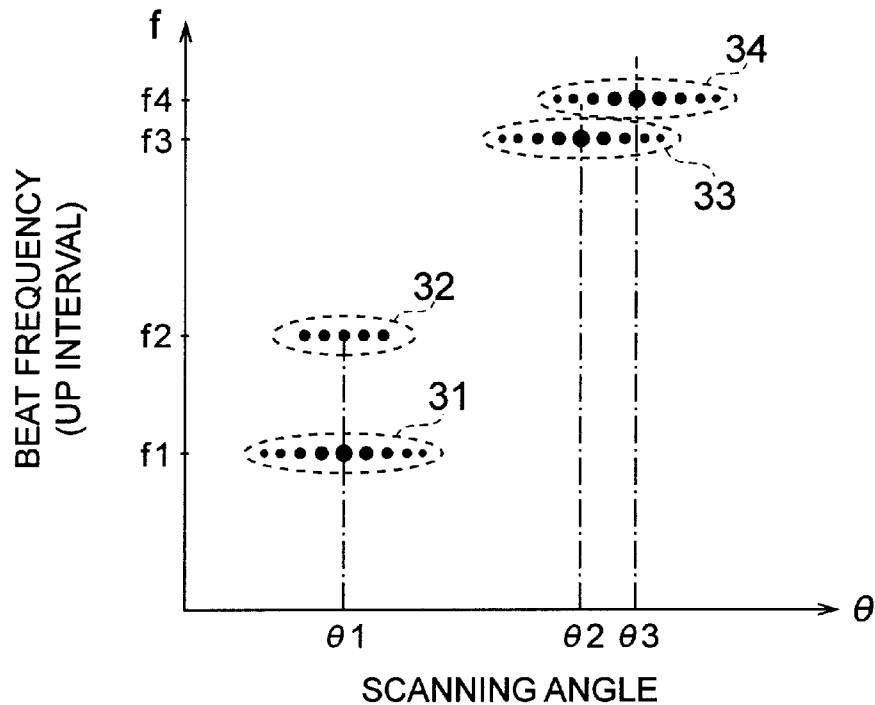
FIG. 7A is a diagram for explaining grouping of level peaks.
Figure 7B:
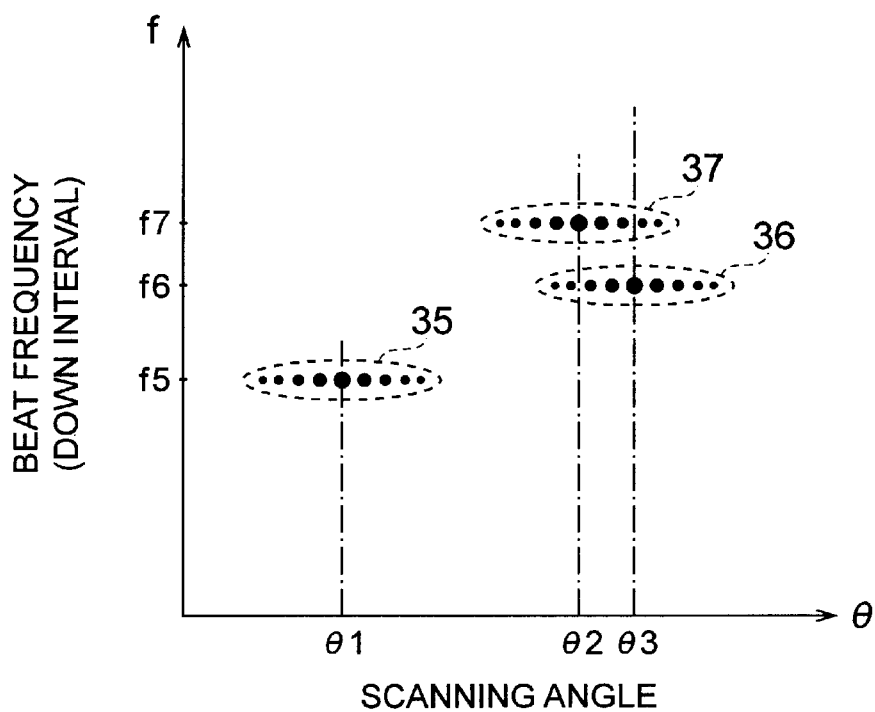
FIG. 7B is a diagram for explaining the grouping of level peaks.

FIG. 7A and FIG. 7B are graphs to show the details of the grouping operation, wherein FIG. 7A shows the grouping in the up interval and FIG. 7B the grouping in the down interval. In FIG. 7A and FIG. 7B, the scanning angles are plotted along the abscissa while the beat frequencies along the ordinate. Each level peak is indicated by a dot and the size of each dot indicates a height of a level peak. The higher the level peak, the larger the size of dot.

Let us suppose that the processing of the up interval is under way at present. Referring to FIG. 7A, it is seen that there exist a plurality of level peaks at the beat frequency f1 continuously in a scanning range around the scanning angle θ1. In step S6 these level peaks are grouped into one level peak group 31. Likewise, there are plural level peaks at each beat frequency f2, f3, or f4 in the scanning angle range around the scanning angle θ1, θ2, or θ3, respectively, and thus they are grouped into a level peak group 32, 33, or 34, respectively.

FIG. 7B is the result of application of the like grouping to the level peaks in the down interval, in which level peak groups 35, 36, 37 are created at respective beat frequencies f5, f6, f7.

Step S5 and step S6 are carried out for each of the up interval and down interval and, after completion thereof for the both intervals, the processing unit moves to step S8.

Step S8 is to perform pairing between the level peak groups of the up interval and the level peak groups of the down interval. The pairing is to mate two level peak groups assumed to be based on a single target, with each other, and a way of the pairing will be described referring to FIGS. 7A and 7B.

A typical scanning angle of each level peak group represents a center direction of a target. Level peak groups based on one target can be paired by coupling two level peak groups having an equal typical scanning angle with each other accordingly.

In FIGS. 7A and 7B, the level peak groups 31 and 32 of the up interval both have the typical scanning angle θ1 and can be mated with the level peak group 35 having the typical scanning angle θ1 in the down interval. As for the typical scanning angle θ2, the level peak group 33 of the up interval is paired with the level peak group 37 of the down interval; as for the typical scanning angle θ3, the level peak group 34 of the up interval is paired with the level peak group 36 of the down interval.

Since for the typical scanning angle θ1 there are the two level peak groups 31, 32 in the up interval, it is necessary to employ either one as a pairing counterpart of the level peak group 35 of the down interval and eliminate the other. A selection factor in this case can be either comparison between maximums of level peaks or comparison between their level peak distribution widths. Pairing is made between level peak groups with closer maximums of level peaks or between level peak groups with closer level peak distribution widths. The reason is that the level peak maximums or the level peak distribution widths should be approximately equal as long as the level peak groups are based on the reflected wave from one target.

From either of the viewpoints, the pairing counterpart of the level peak group 35 is the level peak group 31 and the level peak group 32 is handled as noise. In this case, the data of level peak group 32 is ignored; however, this operation, at least, can avoid an error of pairing between the level peak group 35 and the level peak group 32.

One-to-one correspondence is definitely defined as to the typical scanning angles θ2 and θ3. What should be noted here is that, because the pairing is carried out using the typical scanning angles, correct pairing is achieved even if the relation of magnitude of beat frequencies is reverse between in the up interval and in the down interval.

If the pairing were conducted between the individual level peaks according to equal scanning angles without the grouping, the level peaks composing the level peak group 33 could be paired with the level peaks composing the level peak group 36 with an extremely high possibility. The present embodiment, however, can avoid such a pairing error.

After completion of the pairing in step S8 in this way, the processing unit transfers to step S9 to calculate the distance and speed of each target using the beat frequencies of the level peak groups thus paired. This arithmetic operation is one based on the fundamental principle of the FM-CW radar apparatus.

The detection principle of the FM-CW radar apparatus will be described briefly below for reference' sake.

Let f0 be the center frequency of the transmitted signal, ΔF be the frequency modulation width, fm be the FM modulation frequency, fr be a beat frequency when the relative speed of the target is zero (the beat frequency in a narrow sense), fd be a Doppler frequency based on the relative speed, fb1 be a beat frequency in the up interval, and fb2 be a beat frequency in the down interval. Then the following equations hold.

$$fb1 = fr - fd \quad (3)$$

$$fb2 = fr + fd \quad (4)$$

Once the beat frequencies fb1 and fb2 in the up interval and the down interval of modulation cycle are measured separately, fr and fd can be calculated from the following equations (5) and (6) accordingly.

$$fr = (fb1 + fb2)/2 \quad (5)$$

$$fd = (fb2 - fb1)/2 \quad (6)$$

After fr and fd are calculated, the range R and velocity V of target can be calculated according to the following equations (7) and (8).

$$R = (C/(4 \cdot \Delta F \cdot fm)) \cdot fr \quad (7)$$

$$V = (C/(2 \cdot f0)) \cdot fd \quad (8)$$

Here, C is the speed of light.

In the case of the example of FIGS. 7A and 7B, in the combination of the level peak group 33 with the level peak group 37, f3 and f7 correspond to fb1 and fb2, respectively, in above Eqs. (3) to (6).

In step S10, time series motion of targets is detected by combination of the ranges R and velocities V of targets thus obtained with past target information and types and future motion of the targets are predicted from the time series motion, so as to perform more detailed target recognition.

The present embodiment is arranged to calculate the curvature radius of the lane by the lane curvature detector 28 and determine the scanning range according to the result, but the radar apparatus may also be arranged to acquire the shape of the lane from a navigator system or the like and determine the scanning range according to the result thereof.

As described above, the on-vehicle DBF radar apparatus of the present invention is arranged to limit the scanning range according to the shape of the lane, whereby the DBF operation amount can be decreased. This can increase the detection rate. In addition, the target detection accuracy can be enhanced, because the detection is not carried out in the unnecessary areas.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An on-vehicle DBF radar apparatus mounted on a vehicle and arranged to detect an object in the vicinity of said vehicle by radar beam scanning wherein FM-CW signals are used as transmitted signals, said transmitted signals are mixed with received signals to generate beat signals, which are subsequently converted into digital beat signals, said digital beat signals are subjected to digital signal processing so as to synthesize radar beams, and said synthesis of the radar beams in a plurality of directions carries out the radar beam scanning, and wherein said DBF radar apparatus comprises lane shape acquiring means for acquiring a shape of a lane on which said vehicle is driving, means for limiting the directions in which said radar beams are synthesized according to the shape of the lane acquired by said lane shape acquiring means so as to limit a scanning range of said radar beam scanning, and means for limiting frequency ranges of said digital beat signals used in said synthesis of the radar beams based on the shape of the lane and according to the directions in which the radar beams are to be synthesized.

2. The on-line DBF radar apparatus according to claim 1, wherein a center of said scanning range varies along said shape of the lane.

3. The on-vehicle DBF radar apparatus according to claim 1, wherein said lane shape acquiring means is lane curvature detecting means for detecting a radius of curvature of the lane.

4. The on-vehicle DBF radar apparatus according to claim 3, wherein said lane curvature detecting means is means for obtaining the radius of curvature of the lane from a velocity and a yaw rate of the vehicle.

5. An on-vehicle DBF radar apparatus mounted on a vehicle and arranged to detect an object in the vicinity of said vehicle by radar beam scanning wherein FM-CW signals are used as transmitted signals, said transmitted signals are mixed with received signals to generate beat signals, which are subsequently converted to digital beat signals, said digital beat signals are subjected to digital signal processing, so as to synthesize radar beams, and said synthesis of the radar beams in a plurality of directions carries out the beam scanning, and wherein said DBF radar apparatus comprises means for limiting frequency ranges of said digital beat signals used in the synthesis of said radar beams according to directions in which the radar beams are to be synthesized.

6. An on-vehicle DBF radar apparatus according to claim 5, wherein the scanning range of said radar beams becomes narrower stepwise with increases in frequencies of said digital beat signals.

* * * * *